Patented Sept. 22, 1925.

1,554,483

UNITED STATES PATENT OFFICE.

PRESTON PERKINS BAILEY AND ETTA MAUE BAILEY, OF BOUNDBROOK, NEW JERSEY.

METHOD OF CLEANING ALUMINUM.

No Drawing.      Application filed February 5, 1924.   Serial No. 690,880.

*To all whom it may concern:*

Be it known that we, PRESTON P. BAILEY and ETTA MAUE BAILEY, citizens of the United States, residing at Boundbrook, in the county of Somerset and State of New Jersey, have invented certain new and useful Improvements in Methods of Cleaning Aluminum, of which the following is a specification.

This invention relates to methods of cleaning aluminum and materials therefor.

An object of the invention is the provision of a method of cleaning aluminum household articles whereby stains formed in aluminum vessels in cooking may be removed without scraping or scouring.

A further object is the provision of a material particularly suitable for use in cleaning aluminum.

In the present invention, we employ an organic acid, a salt of an organic acid or a mixture of an organic acid and organic acid salt. This material, either alone or in a mixture with a source of carbohydrates, is dissolved in water and placed in the pan or vessel to be cleaned. The solution is then heated and allowed to boil for a period of time after which the solution is allowed to cool in the vessel and the vessel then washed with warm water.

The organic acid employed may be chosen from a large field, such as acetic acid, benzoic acid, citric acid, malic acid, malonic acid, oxalic acid, and tartaric acid. Salts of the above acids may be employed either in place of the acid or in admixture therewith and as examples, such salts as sodium-bitartrates or potassium tetraoxalate $KHC_2O_4, H_2C_2O_4, 2H_2O$. A suitable source of carbohydrate, such as sugar, starch, dextrines, gums, or cellulose may be added to the acid, salt, or mixture of acid and salt. In place of the acid, fruit juices or extracts of fruit juices containing organic acids or salts of organic acids may be employed.

In a typical embodiment of the invention, 20 grams of oxalic acid are dissolved in a pint of water and placed in the vessel to be cleaned. The solution is placed in the vessel in sufficient quantity to fill it above the stains to be removed. The vessel containing the solution is then heated to the boiling point, allowed to cool, and then washed with warm water. The proportion of the oxalic acid or other material employed may vary within wide limits and from 15 grams to 200 grams per pint of water may be employed. In place of the boiling operation, stronger solutions may be allowed to stand in the vessel for a period of substantially 24 hours, then removed and the vessel washed in warm water. When a number of vessels are to be washed, the solution may be heated to the boiling point in one vessel and then transferred to another without permitting it to cool. The first vessel is then ready for the final washing with warm water and the second vessel may be heated to again raise the solution to a boiling point. When the stains to be removed are on the outside of a vessel, it may be immersed in the solution in a larger vessel and heated.

While we have described in detail the preferred practice of our process, it is to be understood that the details of procedure may be widely varied without departing from the spirit of the invention or the scope of the subjoined claims.

We claim:

1. The method of cleaning aluminum which comprises placing aluminum in a solution containing a compound of an organic acid and a material forming a source of carbohydrates, boiling the solution, removing the aluminum, and washing it.

2. The method of cleaning aluminum which comprises placing aluminum in a solution of oxalic acid, boiling the solution, removing the aluminum, and cleaning it.

3. A material for use in cleaning aluminum comprising a mixture of a compound of oxalic acid and a carbohydrate.

In testimony whereof, we affix our signatures.

PRESTON PERKINS BAILEY.
ETTA MAUE BAILEY.